United States Patent
Swimmer et al.

(10) Patent No.: US 7,188,368 B2
(45) Date of Patent: Mar. 6, 2007

(54) METHOD AND APPARATUS FOR REPAIRING DAMAGE TO A COMPUTER SYSTEM USING A SYSTEM ROLLBACK MECHANISM

(75) Inventors: Morton Gregory Swimmer, Waedenswil (CH); Ian Nicholas Whalley, Pawling, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 988 days.

(21) Appl. No.: 09/865,246

(22) Filed: May 25, 2001

(65) Prior Publication Data

US 2002/0178374 A1      Nov. 28, 2002

(51) Int. Cl.
G06F 11/30  (2006.01)
H04L 9/00   (2006.01)
G06F 11/00  (2006.01)

(52) U.S. Cl. .......................... 726/24; 726/26; 713/187; 713/188; 714/38

(58) Field of Classification Search ................ 713/188, 713/200, 201; 726/24
See application file for complete search history.

(56) References Cited

U.S. PATENT DOCUMENTS

| | | | |
|---|---|---|---|
| 5,473,769 A * | 12/1995 | Cozza | 714/39 |
| 5,485,575 A * | 1/1996 | Chess et al. | 714/38 |
| 5,822,517 A * | 10/1998 | Dotan | 726/22 |
| 5,832,208 A * | 11/1998 | Chen et al. | 713/201 |
| 5,956,481 A * | 9/1999 | Walsh et al. | 713/200 |
| 5,978,917 A * | 11/1999 | Chi | 713/201 |
| 5,991,881 A * | 11/1999 | Conklin et al. | 713/201 |
| 6,263,348 B1 * | 7/2001 | Kathrow et al. | 707/203 |
| 6,535,998 B1 * | 3/2003 | Cabrera et al. | 714/15 |
| 2002/0144129 A1 * | 10/2002 | Malivanchuk et al. | 713/188 |
| 2002/0178375 A1 * | 11/2002 | Whittaker et al. | 713/200 |

* cited by examiner

Primary Examiner—Kambiz Zand
(74) Attorney, Agent, or Firm—Duke W. Yee; Wayne P. Bailey

(57) ABSTRACT

A method and apparatus for managing protecting data from damage in a data processing system. The data is journaled to form journaled data. A determination is then made as to whether a virus is present in the data processing system after journaling of data has begun. Journaling involves storing a system state before an action is executed so that the state can be restored upon demand. The detection of a virus may be performed by using pattern matching on system audit trails in which the system audit trails contain activities occurring within the data processing system. In response to an identification of the virus, the data is restored to its previous state using the journaled data.

37 Claims, 5 Drawing Sheets

METHOD AND APPARATUS FOR REPAIRING DAMAGE TO A COMPUTER SYSTEM USING A SYSTEM ROLLBACK MECHANISM

BACKGROUND OF THE INVENTION

1. Technical Field

The present invention relates generally to an improved data processing system and in particular to a method and apparatus for managing data within a data processing system. Still more particularly, the present invention provides a method and apparatus for repairing damage caused by an unauthorized intrusion into a data processing system.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach.

Further, the Internet has provided a medium for widespread messaging using electronic mail, also referred to as e-mail. With e-mail, a user may send a message to another user quickly over large geographic distances. For example, the sender of an e-mail may be located in New York while the recipient is located in Los Angeles. The transfer of e-mail may take only seconds as compared to days with the use of the post office to send a letter. Thus, more and more messages are being sent by e-mail rather than traditional mail.

With this widespread use of the Internet, threats from unauthorized intrusions, such as viruses, has become more common. A virus is a routine or program that can infect other routines or programs by modifying the target routines or programs, or the environment such that execution of the virus will result in the execution of a possibly modified copy of the virus. For example, if a program containing a virus is executed, the virus code is activated and attaches copies of itself to other programs in the system. Infected programs copy the virus to other programs. The effect of the virus may be a simple prank that pops up a message on screen out of the blue, or it may destroy programs and data right away or on a certain date. For example, a virus may lie dormant and damage a computer system once a year. Computer viruses and similar threats can be detected by matching patterns of known virus behavior in detailed system audit trails. In general, such a system is called an intrusion detection system (IDS). The IDS only detects the virus after it has run and infected the system, potentially damaging the system as well. Therefore, it would be advantageous to have an improved method and apparatus for repairing damage caused by an unauthorized intrusion of a data processing system.

SUMMARY OF THE INVENTION

The present invention provides for a method and apparatus for protecting data from damage in a data processing system. The data is journaled to form journaled data. A determination is then made as to whether a virus is present in the data processing system after journaling of data has begun. Journaling involves storing a system state before an action is executed so that the state can be restored upon demand. The detection of a virus may be performed by using pattern matching on system audit trails in which the system audit trails contain activities occurring within the data processing system. In response to an identification of the virus, the data is restored to its previous state using the journaled data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
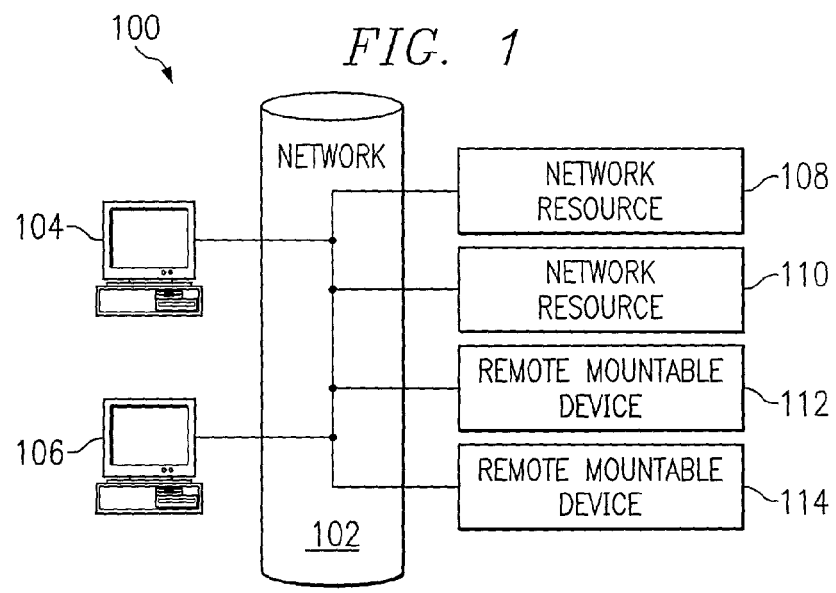
FIG. 1 is a diagram of a network data processing system in accordance with a preferred embodiment of the present invention.

With reference now to the figures, and in particular to FIG. 1, a diagram of a network data processing system is depicted in accordance with a preferred embodiment of the present invention. Network data processing system 100 is a network of computers and other devices in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In this example, workstation 104 and workstation 106 are data processing systems connected to network 102. Additionally, network resource 108 and network resource 110 are also connected to network 102. Network resource 108 includes a journaling capability, for example, a remote mountable device hosted on a server with journaling installed. On the other hand this capability is absent from network resource 110, for example, a remote mountable device hosted on a server without journaling installed. Remote mountable device 112 and remote mountable device 114 are connected to network 102. Remote mountable device 112 includes full control while remote mountable device 114 has limited control. A remote mountable device may be, for example, a hard disk drive or a storage unit in a tape drive system.

The present invention provides a method, apparatus, and computer-implemented instructions for detecting unauthorized intrusions in a data processing system, such as workstation 104, and for repairing damage to the system using a system rollback mechanism. Computer viruses and similar threats can be detected by matching patterns of known virus behavior in detailed system audit trails. The audit trails contain sequences of actions or transactions occurring within a data processing system. Pattern matching may be implemented in an intrusion detection system (IDS). The particular type of IDS used in the depicted examples is called a misuse intrusion detection system. The IDS only detects the virus after it has run and infected the system, potentially damaging the system as well. The present invention combines this IDS system with a journaling system tailored specifically to viruses. Furthermore, other intrusions in addition to those caused by viruses may be handled using the mechanism of the present invention.

In particular, a journaling mechanism is implemented in which the system state of a data processing system may be saved for use in restoring this state if an unauthorized intrusion is detected. Journaling is the method of saving a system state before transactions are executed so that this state can be restored on demand. Journaling may be applied to different system objects, such as a data file or a program. For example, a file that is being modified or just the part of the file that is being modified may be saved. This mechanism requires tracking data dependencies when multiple processes modify the same system object. If a rollback to a prior state is required for the modifications performed by one process in the data processing system, the data dependencies indicate whether the rollback can be safely achieved. Tracking the dependencies and storing the journal data is usually very expensive. The mechanism of the present invention optimizes journaling to minimize resource use when detecting viruses using an IDS, as described in more detail below.

Additionally, the mechanism of the present invention may be used to restore the state of data located externally to a workstation, such as workstation 104. For example, actions may be taken by workstation 104 in which these actions affect data and other devices or data processing systems. An action may write or modify data in workstation 106 or remote mountable device 112. Data may be journaled within workstation 104 or in another location, such as network resource 108, which contains a journaling capability.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
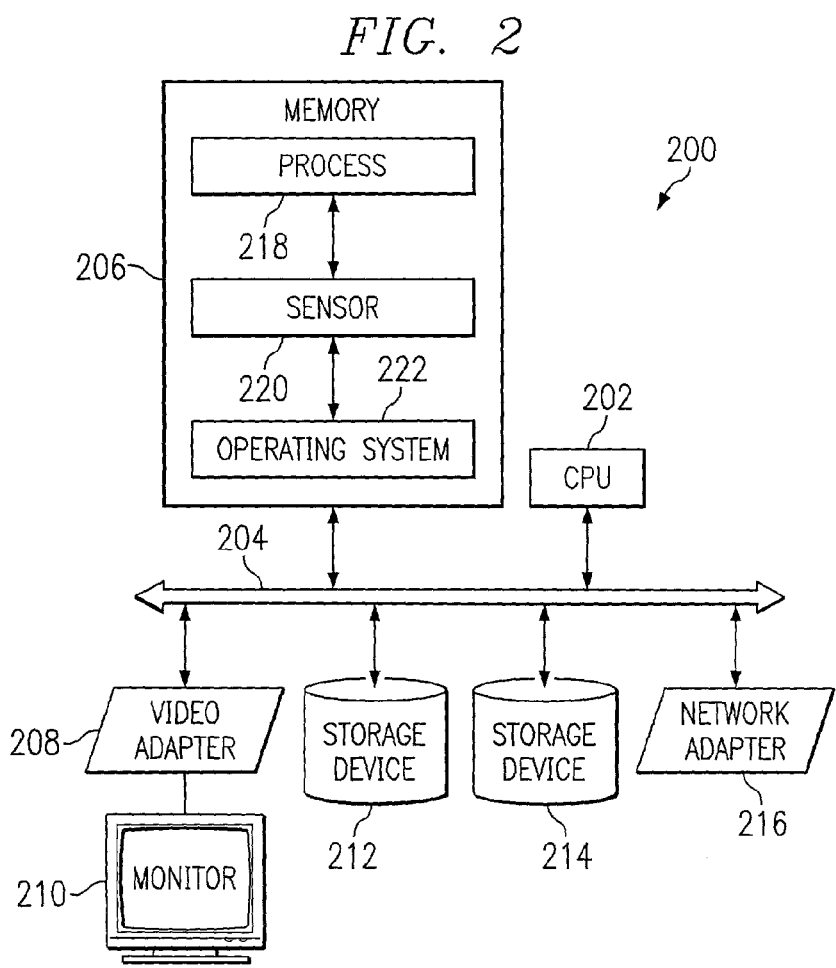
FIG. 2 is a diagram of a data processing system in accordance with a preferred embodiment of the present invention.

Turning next to FIG. 2, a diagram of a data processing system is depicted in accordance with a preferred embodiment of the present invention. Data processing system 200 may be used to implement a workstation, such as workstation 104 or workstation 106 in FIG. 1. In this example, central processing unit (CPU) 202 is connected to bus 204. Bus 204 may be implemented using various bus architectures. One such architecture is a peripheral component interconnect (PCI) bus system. Also connected to bus 204 is memory 206 and video adapter 208. Video adapter contains a connection to display devices, such as monitor 210. Storage device 212 and storage device 214 also are connected to bus 204. These devices may be, for example, a hard disk drive, a floppy disk drive, or a tape drive. Network adapter 216 is connected to bus 204 and provides a connection to a network, such as network 102 in FIG. 1.

In this example, memory 206 contains process 218, sensor 220 and operating system 222. Typically, access to data on a storage device, such as storage device 212 occurs with process 218 sending a request or command to access data to operating system 222. In the depicted example, sensor 220 receives the request or command and sends that request to operating system 222. Sensor 220 contains the processes of the present invention in these examples. In particular, the detection of unauthorized intrusions, journaling of data, and restoring of data are implemented within sensor 220.

As used herein, sensor 220 acts as a system call filter such that selected system calls cause processes to be redirected to sensor 220 rather than directly to operating system 222. Alternatively, sensor 220 may be built into the kernel of operating system 222 depending on the particular implementation.

Sensor 220 may be implemented in a number of different ways. For example, many modern UNIX systems offer one or more of: (1) a system call tracing service (often called 'strace'); (2) a library call tracing service (often called 'ltrace'); and (3) a kernel call tracing service (often called 'ktrace'). In such an environment, practical implementations of the sensor(s) will probably make use of one or more of these services. However, sensor 220 could be implemented without the assistance of any of the above services. In Microsoft Windows, which is available from Microsoft Corporation, the sensor is implemented in a similar manner except there is no convenient system-provided tracing service to use. Instead a tracing service is created by redirecting all calls to the file system, and any other part of the operating system that is to be monitored, to the routine of the present invention. This routine records the access data before allowing the request from the process to proceed. The precise method for redirecting the service requests varies with the version of Windows, but the concept stays the same. Those of ordinary skill in the art will recognize that there may even be multiple methods of redirection with one operating system version, with varying degrees of reliability.

According to the present invention, the method recommended by the operating system vendor is chosen. In UNIX systems where a system-provided tracing service is not available, a separate sensor is created. This method can, in fact, be used on any type of operating system. In these examples, the implementation is described with respect to a Windows operating system platform from Microsoft Corporation. Those of ordinary skill in the art will recognize that the concepts described herein are applicable to other operating systems and hardware as well.

Figure 3:
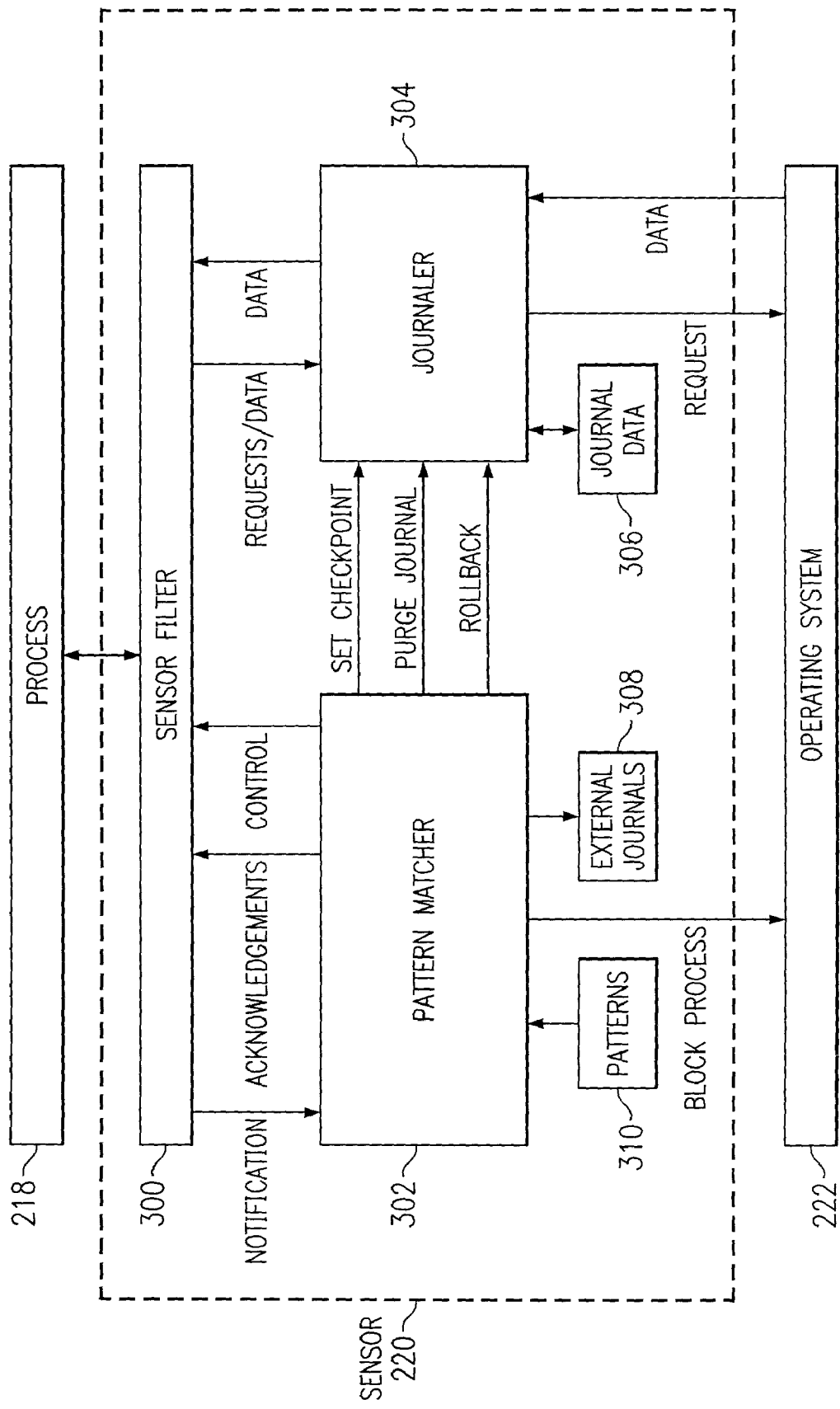
FIG. 3 is a block diagram of components used in detecting intrusions and repairing damage from intrusions in accordance with a preferred embodiment of the present invention.

With reference now to FIG. 3, a block diagram of components used in detecting intrusions and repairing damage from intrusions is depicted in accordance with a preferred embodiment of the present invention. Sensor 220 includes sensor filter 300, pattern matcher 302, and journaler 304. Sensor filter 300 receives calls from process 218 to access data. Calls are redirected to sensor filter 300 rather than proceeding directly to operating system 222. Pattern matcher 302 receives a notification of calls made by process 218. Pattern matcher 302 will return an acknowledgment to sensor filter 300. Additionally, pattern matcher 302 may send a control signal back to sensor filter 300, to modify the behavior of the filter, if necessary. The request to access data from process 218 is sent by sensor filter 300 to journaler 304, which passes this request onto operating system 222. Data is returned from operating system 222 to process 218 through journaler 304 and sensor filter 300.

Pattern matcher 302 will send a signal to set a checkpoint to journaler 304. The checkpoint indicates the point in the journal data at which pattern matching begins by pattern matcher 302. This checkpoint signal is used by journaler 304 to begin storing data accessed by process 218 as journal data 306. The journaling functionality implemented in journaler 304 allows sensor 220 to save data being modified by a call from process 218. Further, pattern matcher 302 also may send signals to external journals 308, such as network resource 108 in FIG. 1, to journal data. Pattern matcher 302 will compare sequences of activities, such as requests by process 218, to patterns 310. A match with a pattern may identify an occurrence of an unauthorized intrusion. Further, a match also may identify that an absence of an unauthorized intrusion is present.

If an unauthorized intrusion is absent due to a match or due to some amount of time or number of activities passing by, pattern matcher 302 sends a signal to journaler 304 to purge journal data 306. Then, another checkpoint is set to begin journaling data. On the other hand, if an unauthorized intrusion is identified, pattern matcher 302 sends a signal to journaler 304 to "rollback" or restore the state of the data using journal data 306. In addition, pattern matcher 302 will send a signal to operating system 222 to block access or halt execution of process 218. Similar signals may be sent by pattern matcher 302 to external journals 308 to purge journals or rollback data. Finally, sensor filter 300, passes the request from process 218 to operating system 222, receives any responses from operating system 222, and transfers these back to the process.

The journaling functionality in journaler 304 may be implemented in a number of different ways. For example, in one implementation, the data that is being written is cached for process 218 alone, but the original object is left unmodified until the sensor 220 is satisfied that process 218 does not exhibit the virus property. Only then is the data written to the system. Any reads by process 218 to the data are redirected to the cached version of the object. Any access to the object from a different process is blocked until sensor 220 is either satisfied that process 218 is not a virus and process 218 has released the object from use, or determines that the process is a virus, and sensor 220 has restored the object.

The advantage of this implementation is that it avoids the need to maintain a list of dependencies. A different process accessing the object is blocked until the sensor 220 has made its determination as to whether or not process 218 is a virus, and possibly restore the object based upon the results of that determination. Since the time needed to detect the virus is typically short, the blocking should not have much impact unless two processes need to cooperate and the blocking results in a deadlock situation. This method is easiest to implement, but is not optimal for complex systems with a lot of inter-process communication.

In another implementation, when sensor 220 determines that data is about to be overwritten, it saves that data to a protected memory (only accessible to sensor 220) before allowing the write to proceed. Once sensor 220 has decided that process 218 is not viral (that is to say, does not exhibit properties displayed by viruses), then the data stored in the protected memory can be released. In the converse case (i.e. that process 220 exhibits properties displayed by viruses), the data that it overwrote can be restored using the stored copies in the protected memory. Because the sensors are able to detect a virus fairly quickly, the data is not kept very long and the dependency lists are fairly short. In the situation where multiple processes are accessing the same area of data, then sensor 220 will have to preserve multiple, interdependent, copies of the that data, as well as information about which process 218 wrote which data and when the data was written.

The advantage of this second example of journaling is that it avoids blocking other processes. However, that comes at the price of higher overhead. Since the journal data is released quickly, the build up of dependency overhead may peak but is minimal over time.

In another embodiment, whenever data is written to an object, the entire object is saved in protected memory. Dependency tracking is needed as described above, except that at every modification, another copy of the entire object is made. This embodiment is only interesting when accessing the buffers containing the information to be written is difficult. This example is only advantageous if it is easier to access to the system object than to the access system call buffers. Otherwise, it would waste too much space.

The present invention may employ any of these journaling mechanisms and may include other variations not explicitly mentioned. The choice will depend on the capabilities of the operating system on which the sensor is implemented.

Figure 4:
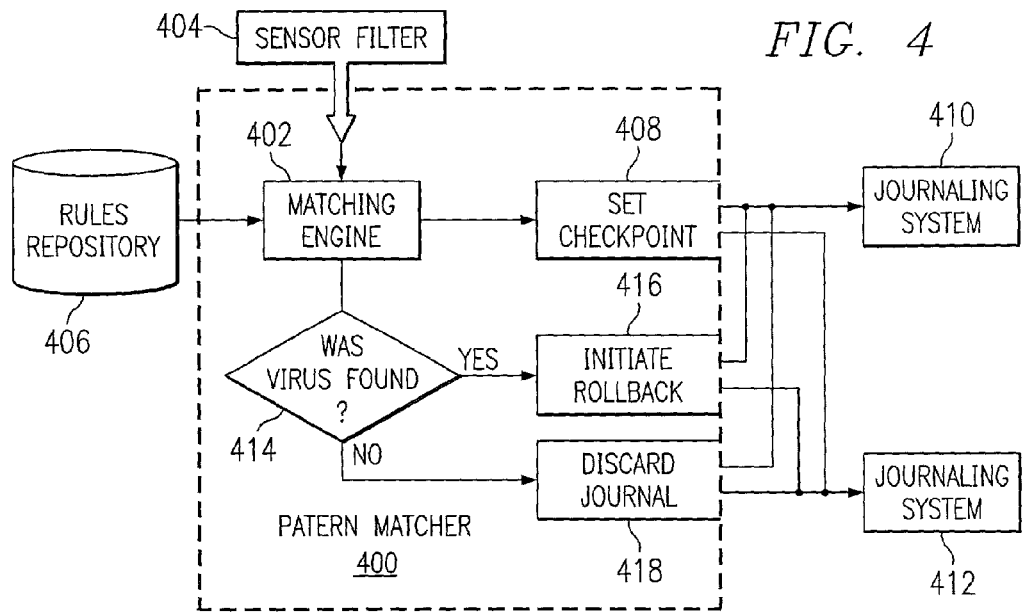
FIG. 4 is a data flow diagram illustrating pattern matching and journaling in accordance with a preferred embodiment of the present invention.

Turning next to FIG. 4, a data flow diagram illustrating pattern matching and journaling is depicted in accordance with a preferred embodiment of the present invention. In the depicted examples, pattern matcher 400 may be implemented as pattern matcher 302 in FIG. 3. In these examples, the data is a set or sequence of actions. Matching engine 402 compares these actions received from sensor filter 404 to different patterns located within rules repository 406. The rules define patterns, which are considered to be associated with a virus being present. Further these rules define patterns, which eliminate the possibility of a virus being present.

Matching engine 402 sends a signal to set a checkpoint in block 408. This checkpoint is set in journaling system 410 and journaling system 412. The checkpoint indicates the point at which pattern matching is performed by matching engine 402.

In block 414, a determination is made as to whether a virus was found. If a virus was found, a rollback is initiated in block 416 to return data back to the state present when the checkpoint was set by matching engine 404. This rollback or return of data to the previous state is performed by journaling system 410 and journaling system 412 in this example. If an absence of a virus occurs in block 414, a signal to discard the journal is made in block 418, which causes journaling system 410 and journaling system 412 to discard the journaled data stored in these systems.

Figure 5:
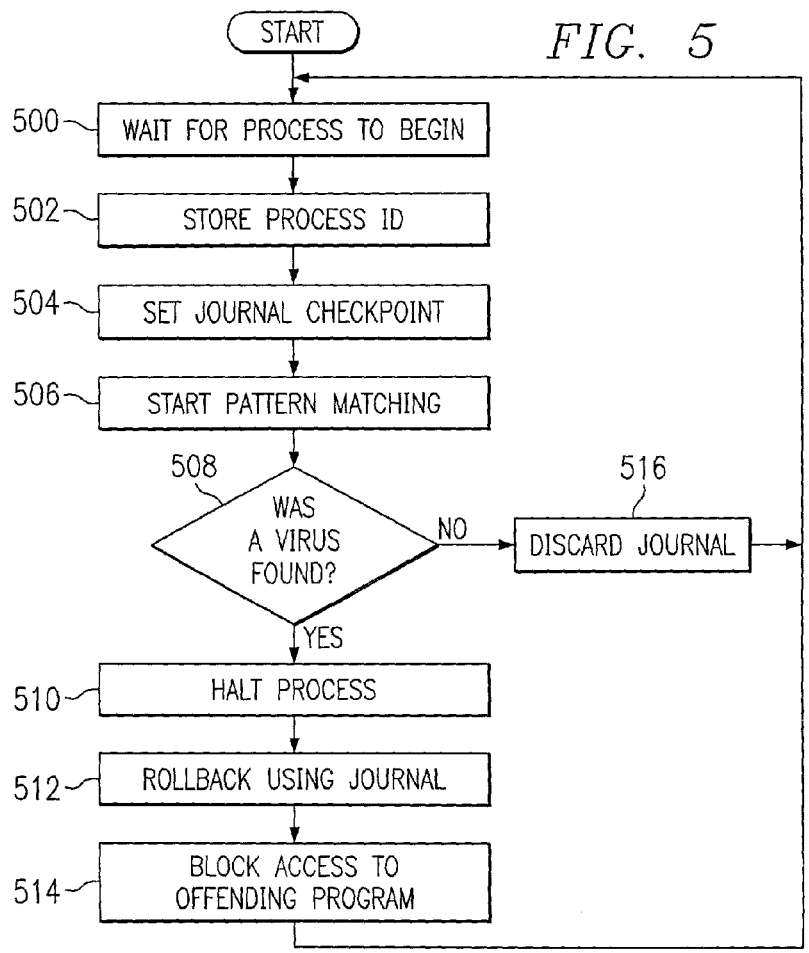
FIG. 5 is a flowchart of a process used for detecting unauthorized intrusions and repairing damage from unauthorized intrusions in accordance with a preferred embodiment of the present invention.

With reference now to FIG. 5, a flowchart of a process used for detecting unauthorized intrusions and repairing damage from unauthorized intrusions is depicted in accordance with a preferred embodiment of the present invention. The process illustrated in FIG. 5 may be implemented in sensor, such as sensor 220 in FIG. 2.

The flow in this figure begins by waiting for a process to begin (step 500). In the depicted examples, data is journaled and actions are matched to patterns for a particular process executing on a data processing system. An identification of the process is stored (step 502). The process ID is used to differentiate this process from others that might be accessing the same objects. Next, a journal checkpoint is set (step 504). The journal checkpoint is used to initiate journaling or storing data prior to different actions being taken by the process. Pattern matching is started (step 506). Pattern matching is used to identify whether a virus is present. This step is described in more detail in FIG. 6 below. A determination is then made as to whether a virus has been found (step 508). The determination in step 508 is based on the results of pattern matching in step 506. If a virus is found, the process is halted (step 510). A rollback or restoration of data is made using the journal (step 512). Access to the offending program is then blocked (step 514) with the process returning to step 500. This blocking of the process or program associated with the process is made to prevent any further damage from occurring. Turning back to step 508, if no virus is found, the journal is discarded (step 516) and the process returns to step 500.

Figure 6:
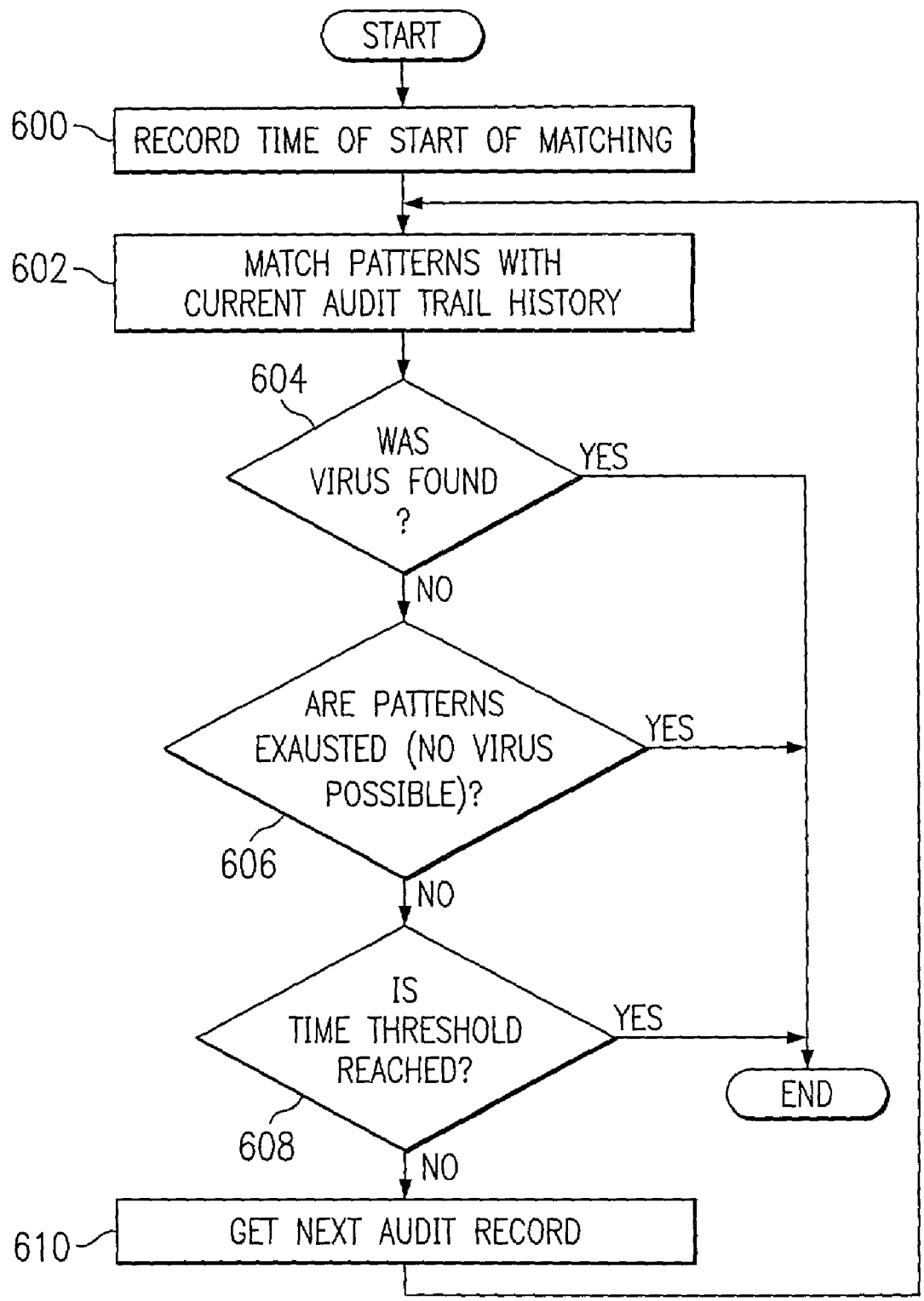
FIG. 6 is a flowchart of a process used for pattern matching in accordance with a preferred embodiment of the present invention.

Turning now to FIG. 6, a flowchart of a process used for pattern matching is depicted in accordance with a preferred embodiment of the present invention. The process illustrated in FIG. 6 is a more detailed description of step 506 in FIG. 5.

The flow in FIG. 6 begins by recording the time when pattern matching starts (step 600). Next, patterns of activities are matched or compared with a current audit trail history (step 602). The patterns of activities are ones that may be used to positively identify or eliminate a possibility of an unauthorized intrusion. The current audit trail history is a set of actions taken or initiated by the process or program. A determination is then made as to whether a virus has been found (step 604). If a virus is found, the flow terminates. Otherwise, a determination is made as to whether the patterns are exhausted (step 606). In the depicted examples, if all the patterns have been examined, it is assumed that the presence of a virus is not possible with respect to the set of patterns being used for pattern matching.

If the patterns are exhausted, the flow terminates. If the patterns are not exhausted, a determination is made as to whether a time threshold has been reached (step 608). In step 608, if the time threshold is reached and no pattern is matched, it is assumed that no virus is present because of the lack of activities associated with a virus, and the flow terminates. If a time threshold has not been reached, the process retrieves the next audit record (step 610) with the process returning to step 602. The flow illustrated in FIG. 6 may be applied to unauthorized intrusions other than those caused by viruses. For example, the flow may be applied to identifying hacking or malfunctioning processes.

Figure 7:
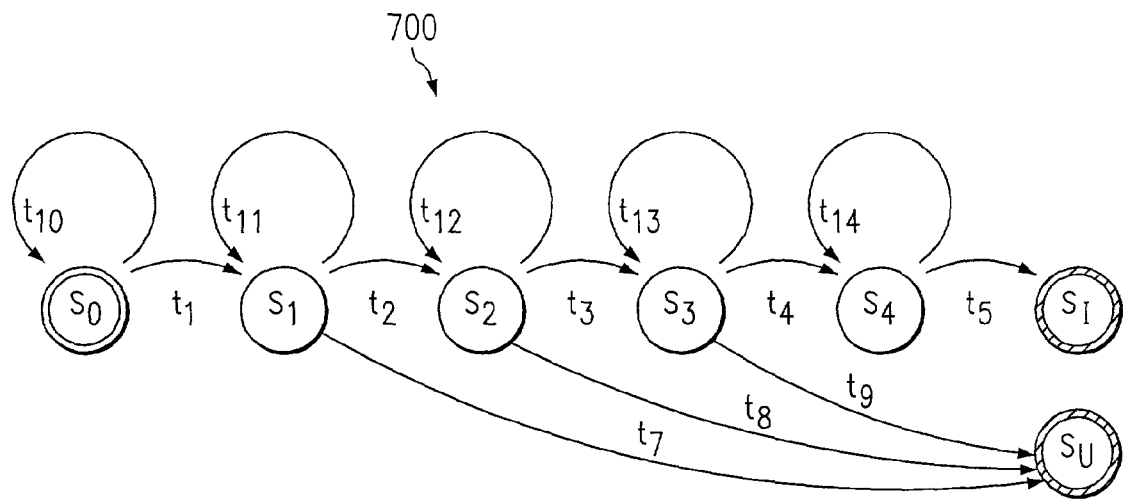
FIG. 7 is a state diagram illustrating identification of unauthorized intrusions in accordance with a preferred embodiment of the present invention.

Turning next to FIG. 7, a state diagram illustrating an example of identification of unauthorized intrusions is depicted in accordance with a preferred embodiment of the present invention. The detection of the virus is facilitated by matching sequences of actions recorded by the sensor with predefined patterns. The patterns are modeled on previously known patterns of misuse by computer viruses or other malware. The patterns are chosen to have a very low false positive rate, i.e., there is only minimal chance that the pattern will match benign behavior. Such a misuse pattern can be expressed in a number of possible ways. In a preferred embodiment, the patterns are expressed as rules in a forward chaining language, such as RUSSEL, OPS5 or as a Coloured Petri Net program. Irrespective of the language used, these rules may be illustrated using state-transition diagrams such as in FIG. 7. These state-transition diagrams are very much like the Coloured Petri Nets that can be used in an implementation of the present invention.

State machine 700 begins in state S0 and if a file is opened (transition t1), state machine 700 moves to state S1 and remains in that state in response to any action except for a read from the beginning of the file (BOF). Upon a read from the BOF (transition t2), state machine 700 shifts to state S2. From state S2, state machine 700 shifts to state S3 in response to a write to end of file (EOF) (transition t3). State machine 700 shifts to state S4 if a write to BOF occurs (transition t4). State machine 700 shifts to state S1 if a close file occurs (transition t5). State S1 indicates an infected state in this example.

Referring back to state S1, if a read from anywhere but the BOF or a close occurs (transition t7), state machine 700 shifts to state SU, which indicates an uninfected state. In state S2, state machine 700 shifts to state SU in response to a write to anywhere but EOF or a close (transition t8). In state S3, state machine 700 also shifts to state SU in response to a write anywhere but BOF or a close (transition t9).

Turning back to state S0, state machine 700 remains in state S0 in response to any operation, but a file open (transition t10). In state S1, state machine 700 remains in this state in response to any operation except a read (transition t11). A read to BOF (transition t2) places state machine 700 into state S2. Any other read (transition t7) places state machine 700 into state SU. In state S2, state machine 700 remains in this state in response to any operation except a write (transition t12). A write to EOF (transition t3) places state machine 700 into state S3. Any other write (transition t8) places state machine 700 into state SU. Next, in state S3, state machine 700 remains in this state in response to any operation but a write (transition t13). A write to BOF (transition t4) places state machine 700 into state S4. Any other write (transition t9) places state machine 700 into state SU. Turning back to state S4, state machine 700 remains in this state in response to any operation (transition t14) except a close file (transition t5).

Still with reference to FIG. 7, a "time to live" value can be associated with the rule, in which the rule must match or the state will automatically change to state SU. This mechanism is necessary to avoid rules being orphaned in the pattern matcher and using resources in both the pattern matcher and the journaler. The value is set by the programmer based on knowledge of the type of intrusion. The time can nearly always be kept very low by tuning the patterns and the "time to live" value together as it is not always necessary to detect the entire chain of events that a intrusion produces. Usually, only the infection process itself needs to be detected and this must be kept short by the virus itself to avoid other parts of the system interfering with the intrusion process. The rule matching can also be terminated by the process terminating. This termination can be specified in the rules. As system misuse is usually instigated by a single process, if a pattern doesn't match by the time the process terminates, the state in the rule can be changed to state SU.

The journaling is also driven by these rules. When the file is written to, as in transition t3 and transition t4, the data (if any) that is being overwritten, is stored or the written information is cached, depending on the journaling method used. This is triggered implicitly by the transition, but in an alternative implementation, the caching also may be embedded in the rules themselves. This mechanism may be used to optimize the amount of information that is journaled. In a preferred embodiment, the journaling is performed implicitly to avoid overburdening the rules. Those of ordinary skill in the art will recognize that both and perhaps other implementations have their own advantages and disadvantages.

Other circumstantial information is kept by the journaling system, such as, for example, the name of the program that created the running process. In the case of multiple concurrent threads in a process, these too are be tracked. When the process ends, this information maybe discarded.

In these examples, reaching the state SI in FIG. 7 triggers the rollback mechanism used to restore the data to a previous state. The program or process application that caused the rule to match is first killed, and then the journal is used to restore infected objects to their original states. The program that created the process is then locked away by whatever means seem fit to prevent it from being run again. This can be done by putting it in a hidden and protected directory, modifying the file's access rights so the user cannot execute the file or modify the rights, or encrypted. Furthermore, the file can be packaged and sent to a Digital Immune System analysis center for further analysis.

Not all system objects are under the control of the CPU on which the detection/rollback system is running. A virus might modify objects outside of the system. An example of this is a file that another system shares for outside access. This file can be infected or modified by the virus as easily as internal system objects. In some cases, the sensor can be programmed to maintain a local cache of these objects. This is another reason why leaving the original data object unmodified can be advantageous. However, if the caching method is not possible, it might be necessary to cooperate with a rollback system on the remote system.

If a rollback or journaling system is installed on the target machine that is included in a trust relationship with the source machine, this can be used. The journaling system can be of the same type as that described here and included as a complete software package. Alternatively, the journaling system can be a third party product with an interface that can be used. Strong authentication and encryption of the communication between the source and target system would be necessary in a practical implementation, but not a prerequisite to the functioning of the method described here.

Thus, using the mechanisms of the present invention, it is possible to defend a system from malicious code, in particular computer viruses, in a manner that requires less maintenance by the producers of the product and the system administrators when compared to a string-based file scanner, and less intervention by the user when required to clean up his system. This advantage is provided through the patterns used to detect the virus, which are able to detect more viruses with fewer patterns and through removing the damage caused by the infection quickly and transparently before the damage becomes manifest. All this can be achieved with a minimum of overheard, comparable with that of an on-access file scanner.

The present invention employs tight coupling detection and journaling components. The type of threat is arbitrary in such a system, so long as detection patterns can be created that detect the threat in such a way that its affects can be removed by the journaler without requiring large amounts of information to be stored for a long time. Therefore the mechanism of the present invention works very well for handling viruses on single user machines.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples illustrate the handling of viruses, the present invention may be applied to other types of unauthorized intrusions, such as hacking and malfunctioning processes. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for dynamically protecting data from damage during execution of processes within the data processing system, the method comprising:
   journaling the data to form journaled data, wherein journaling the data comprises maintaining a system audit trail that contains activities occurring within the data processing system during the execution of the processes within the data processing system;
   dynamically determining whether a virus is present in the data processing system after journaling of the data has begun; and
   responsive to an identification of the virus, restoring the data using the journaled data.

2. The method of claim 1 further comprising:
   responsive to an absence of an identification of the virus, discarding the journaled data.

3. The method of claim 1, wherein the determining step comprises:
   performing pattern matching.

4. The method of claim 3, wherein the performing step includes:
   comparing a set of actions occurring within the data processing system with a set of known virus patterns.

5. The method of claim 1, wherein the data that is journaled is located in a storage device external to the data processing system.

6. The method of claim 1 further comprising:
recording a sequence of actions occurring within the data processing system.

7. The method claim 1, wherein the data that is journaled is data accessed by a process within the data processing system.

8. The method of claim 1 further comprising:
responsive to an identification of the virus, blocking access to the data by a process accessing the data.

9. The method of claim 1 further comprising:
responsive to an identification of the virus, generating an indication halting a process accessing the data.

10. The method of claim 1, wherein the journaled data is accessed by a single process and maintained until a determination is made that the single process is eliminated as a virus candidate.

11. The method of claim 1, wherein the journaled data is stored in a protected memory accessible only by the method.

12. The method of claim 11, wherein the journaled data is stored in a data structure located in a protected memory inaccessible by a process executing within the data processing system.

13. A data processing system comprising:
a bus system;
a communications unit connected to the bus system;
a memory connected to the bus system, wherein the memory includes as set of instructions; and
a processing unit connected to the bus system, wherein the processing unit executes the set of instructions to journal the data to form journaled data, wherein journal the data comprises maintaining a system audit trail that contains activities occurring within the data processing system during the execution of the processes within the data processing system; dynamically determines whether a virus is present in the data processing system after journaling of the data has begun; and restores the data using the journaled data in response to an identification of the virus.

14. A data processing system for dynamically protecting data from damage during execution of processes within the data processing system, the data processing system comprising:
journaling means for journaling the data to form journaled data, wherein the journaling means for journaling the data comprises means for maintaining a system audit trail that contains activities occurring within the data processing system during the execution of the processes within the data processing system;
determining means for dynamically determining whether a virus is present in the data processing system after journaling of the data has begun; and
restoring means, responsive to an identification of the virus, for restoring the data using the journaled data.

15. The data processing system of claim 14 further comprising:
discarding means, responsive to an absence of an identification of the virus, for discarding the journaled data.

16. The data processing system of claim 14, wherein the determining means comprises:
means for performing pattern matching.

17. The data processing system of claim 16, wherein the performing means includes:
means for comparing a set of actions occurring within the data processing system with a set of known virus patterns.

18. The data processing system of claim 14, wherein the data that is journaled is located in a storage device external to the data processing system.

19. The data processing system of claim 14 further comprising:
recording means for recording a sequence of actions occurring within the data processing system.

20. The data processing system claim 14, wherein the data that is journaled is data accessed by a process within the data processing system.

21. The data processing system of claim 14 further comprising:
blocking means, responsive to an identification of the virus, for blocking access to the data by a process accessing the data.

22. The data processing system of claim 14 further comprising:
generating means, responsive to an identification of the virus, for generating an indication halting a process accessing the data.

23. The data processing system of claim 14, wherein the journaled data is accessed by a single process and maintained until a determination is made that the single process is eliminated as a virus candidate.

24. The data processing system of claim 14, wherein the journaled data is stored in a protected memory accessible only by the method.

25. The data processing system of claim 24, wherein the journaled data is stored in a data structure located in a protected memory inaccessible by the process executing within the data processing system.

26. A computer program product in a computer readable medium for dynamically protecting data from damage during execution of processes within the data processing system, the computer program product comprising:
first instructions for journaling the data to form journaled data, wherein journaling the data comprises maintaining a system audit trail that contains activities occurring within the data processing system during the execution of the processes within the data processing system;
second instructions for dynamically determining whether a virus is present in the data processing system after journaling of the data has begun; and
third instructions, responsive to an identification of the virus, for restoring the data using the journaled data.

27. The computer program product of claim 26 further comprising:
fourth instructions, responsive to an absence of an identification of the virus, for discarding the journaled data.

28. The computer program product of claim 26, wherein the second instructions comprises:
sub-instructions for performing pattern matching.

29. The computer program product of claim 26, wherein the sub-instructions for performing includes:
instructions for comparing a set of actions occurring within the data processing system with a set of known virus patterns.

30. The computer program product of claim 26, wherein the data that is journaled is located in a storage device external to the data processing system.

31. The computer program product of claim 26 further comprising:
fourth instructions for recording a sequence of actions occurring within the data processing system.

32. The computer program product claim 26, wherein the data that is journaled is data accessed by a process within the data processing system.

33. The computer program product of claim 26 further comprising:
fourth instructions, responsive to an identification of the virus, for blocking access to the data by a process accessing the data.

34. The computer program product of claim 26 further comprising:
fourth instructions, responsive to an identification of the virus, for generating an indication halting a process accessing the data.

35. The computer program product of claim 26, wherein the journaled data is accessed by a single process and maintained until a determination is made that the single process is eliminated as a virus candidate.

36. The computer program product of claim 26, wherein the journaled data is stored in a protected memory accessible only by the method.

37. The computer program product of claim 36, wherein the journaled data is stored in a data structure located in a protected memory inaccessible by the process executing within the data processing system.

* * * * *